(12) United States Patent
Bang et al.

(10) Patent No.: US 10,340,968 B1
(45) Date of Patent: Jul. 2, 2019

(54) MOBILE TERMINAL AND METHOD FOR CONTROLLING THE SAME

(71) Applicant: LG ELECTRONICS INC., Seoul (KR)

(72) Inventors: Sooho Bang, Seoul (KR); Youngjoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/983,642

(22) Filed: May 18, 2018

(51) Int. Cl.
*H04B 1/38* (2015.01)
*H04B 1/3827* (2015.01)
*H04M 1/02* (2006.01)

(52) U.S. Cl.
CPC ........ *H04B 1/3838* (2013.01); *H04M 1/0202* (2013.01); *H04M 2250/12* (2013.01)

(58) Field of Classification Search
CPC .............. H04B 1/3838; H04M 1/0202; H04M 2250/12
USPC ......................................................... 455/572
See application file for complete search history.

(56) References Cited

U.S. PATENT DOCUMENTS

| 2011/0207508 A1* | 8/2011 | Takahashi | H04M 1/23 455/572 |
| 2012/0214422 A1* | 8/2012 | Shi | H04B 1/3838 455/67.11 |
| 2016/0127523 A1* | 5/2016 | Rouaissia | H04M 1/0266 455/566 |
| 2016/0164563 A1* | 6/2016 | Khawand | H04B 1/3838 455/127.2 |
| 2018/0103436 A1* | 4/2018 | Hawaka | H04B 1/3827 |

* cited by examiner

*Primary Examiner* — Khoi H Tran
*Assistant Examiner* — B M M Hannan
(74) *Attorney, Agent, or Firm* — Lee, Hong, Degerman, Kang & Waimey

(57) ABSTRACT

The present invention relates to a mobile terminal, including a main body, a communication unit mounted in the main body to perform communication with an external device, a proximity sensor to detect a part of a user's body adjacent to the main body when the communication is performed through the communication unit, a signal processing unit to generate primary detection information, indicating the detection result of the part of the user's body adjacent to the main body, based on sensing data received from the proximity sensor, and a processor to transmit a request signal to the signal processing unit to request for secondary detection information, indicating the detection result of the part of the user's body adjacent to the main body, in response to a reception of the primary detection information from the signal processing unit, and to determine whether or not the part of the user's body adjacent to the main body exists, through comparison between the primary detection information and the secondary detection information when the secondary detection information is received through the signal processing unit.

8 Claims, 8 Drawing Sheets

FIG. 8
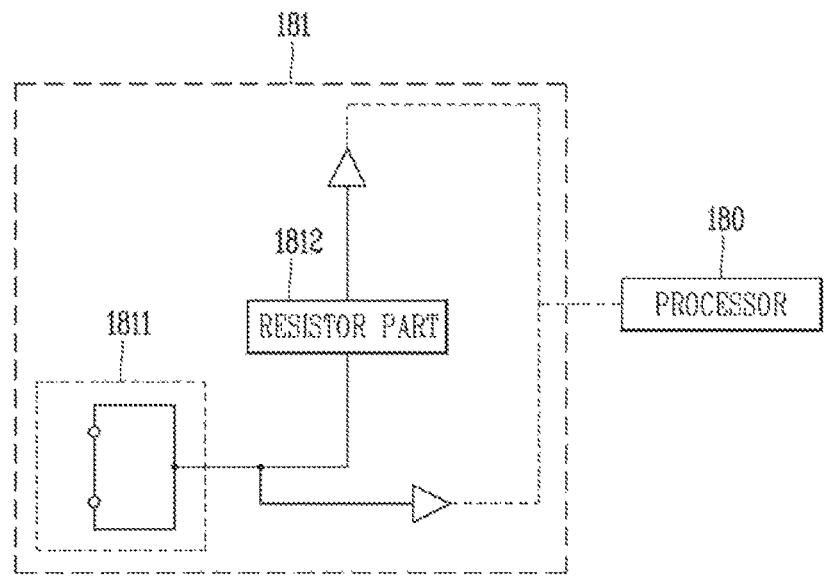
FIG. 9
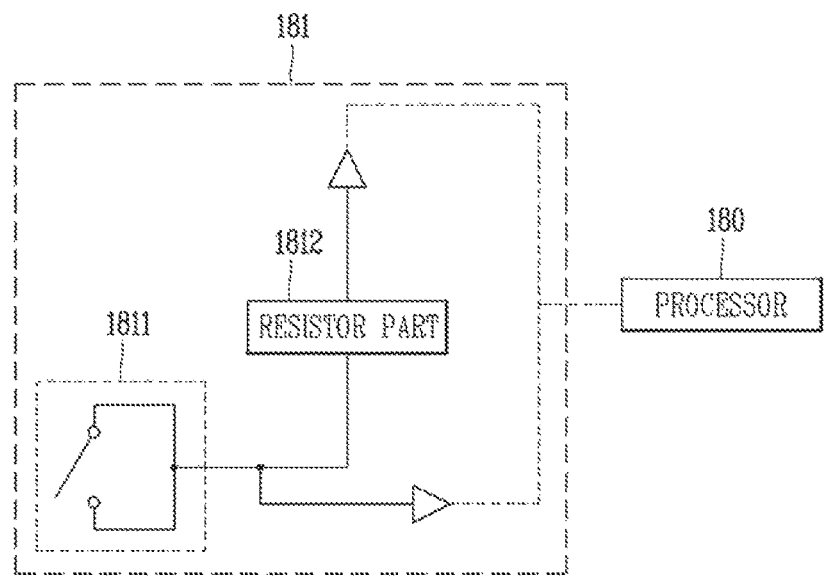

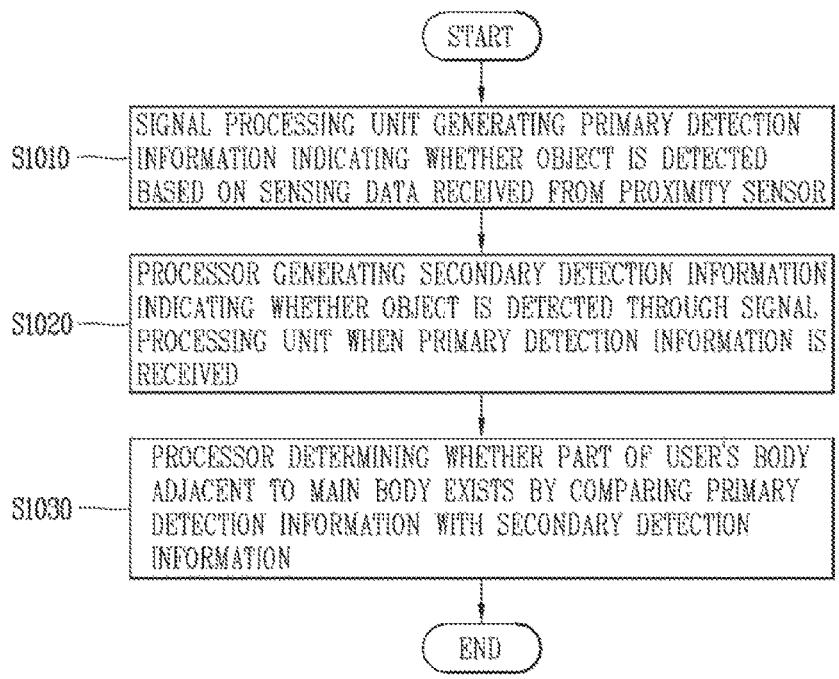
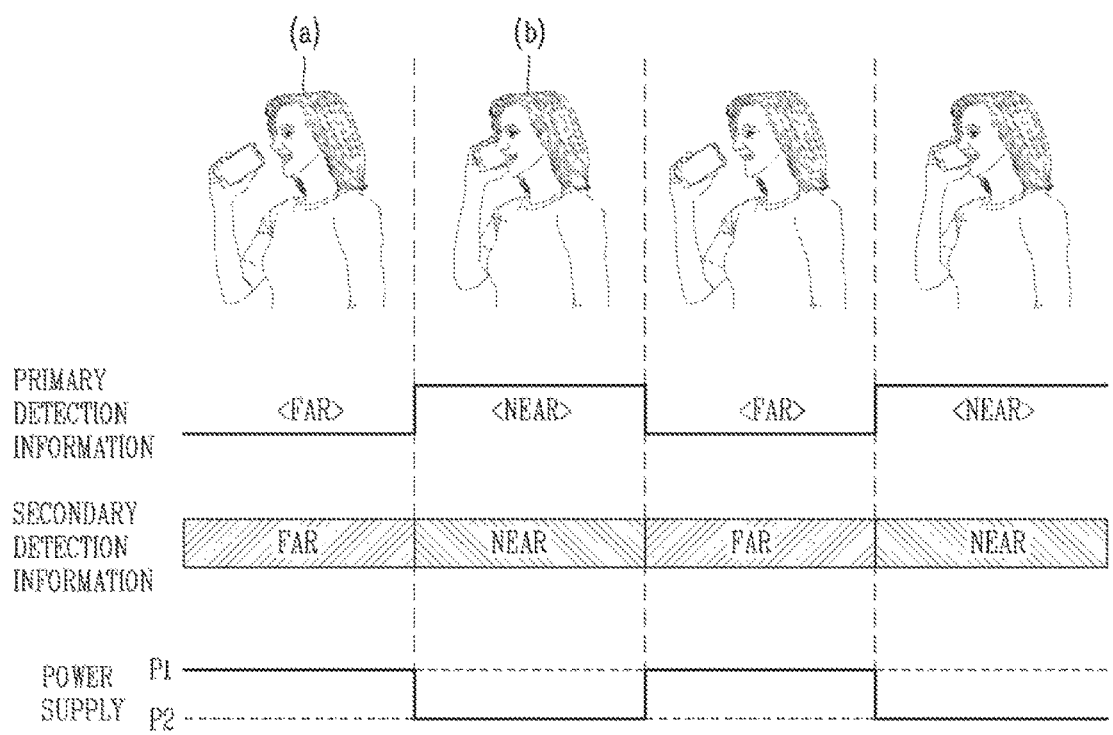

MOBILE TERMINAL AND METHOD FOR CONTROLLING THE SAME

BACKGROUND OF THE INVENTION

1. Field of the Invention

The present invention relates to a mobile terminal capable of responding to (dealing with) failure of a specific absorption rate (SAR) detecting operation.

2. Background of the Invention

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

On the other hand, when an antenna of a mobile terminal transmits a wireless signal with high power, a specific absorption rate (SAR) indicating an absorption rate of electromagnetic waves absorbed by a human body also increases. Since this increased SAR value has a bad influence on the human body, each country specifies an allowable reference value of the SAR value of an electronic device.

The electronic device is designed to determine in real time whether the SAR value meets the allowable reference value through a sensor that detects the SAR. However, when the sensor for detecting the SAR fails, the human body is exposed to electromagnetic waves indiscriminately.

Thus, the present invention proposes a method of responding to failure for preventing a situation that a human body is indiscriminately exposed to electromagnetic waves even if an SAR sensor fails.

SUMMARY OF THE INVENTION

One aspect of the present invention is to provide a method for preventing beforehand a human body from being exposed to electromagnetic waves indiscriminately.

Another aspect of the present invention is to prevent a human body from being exposed to electromagnetic waves even when an SAR detection sensor fails.

To achieve these and other advantages and in accordance with the purpose of this specification, as embodied and broadly described herein, there is provided a mobile terminal, including a main body, a communication unit mounted in the main body to perform communication with an external device, a proximity sensor to detect a part of a user's body adjacent to the main body when the communication is performed through the communication unit, a signal processing unit to generate primary detection information, indicating the detection result of the part of the user's body adjacent to the main body, based on sensing data received from the proximity sensor, and a processor to transmit a request signal to the signal processing unit to request for secondary detection information, indicating the detection result of the part of the user's body adjacent to the main body, in response to a reception of the primary detection information from the signal processing unit, and to determine whether or not the part of the user's body adjacent to the main body exists, through comparison between the primary detection information and the secondary detection information when the secondary detection information is received through the signal processing unit.

In one embodiment, the processor may determine whether or not the part of the user's body adjacent to the main body exists according to the secondary detection information when the primary sensed information and the secondary sensed information coincide with each other, and determine that the part of the user's body adjacent to the main body exists when the primary detection information and the secondary detection information are different from each other.

In one embodiment, the processor may determine that the part of the user's body adjacent to the main body exists when both the primary detection information and the secondary detection information indicate that the part of the user's body adjacent to the main body is detected, and determine that the part of the user's body adjacent to the main body does not exist when both the primary detection information and the secondary detection information indicate that the part of the user's body adjacent to the main body is not detected.

In one embodiment, the processor may determine that the part of the user's body adjacent to the main body exists when the primary detection information indicates that the part of the user's body adjacent to the main body is detected and the secondary detection information indicates that the part of the user's body adjacent to the main body is not detected.

In one embodiment, the processor may determine that the part of the user's body adjacent to the main body exists when the primary detection information indicates that the part of the user's body adjacent to the main body is not detected and the secondary detection information indicates that the part of the user's body adjacent to the main body is detected.

In one embodiment, the signal processing unit may include a switch short-circuited or opened based on sensing data received from the proximity sensor, and a resistor connected to one end of the switch such that a current flows therealong when the switch is opened.

In one embodiment, the switch may be short-circuited when the part of the user's body adjacent to the main body is detected, and opened when the part of the user's body adjacent to the main body is not detected.

In one embodiment, the mobile terminal may further include a communication unit to perform wireless communication, and a power supply unit to supply power to the communication unit. The processor may control power supplied from the power supply unit to the communication unit according to the determination result.

In one embodiment, the processor may reduce an amount of power supplied to the communication unit when it is determined that the part of the user's body adjacent to the main body is detected, and increase the amount of power supplied to the communication unit when it is determined that the part of the user's body adjacent to the main body is not detected.

In one embodiment, the processor may control the proximity sensor to detect the part of the user's body adjacent to the main body when communication is started through the communication unit.

A mobile terminal according to the present invention can determine whether or not a part of a user's body adjacent to the main body exists, by comparing primary detection information detecting the part of the user's body adjacent to the main body by using sensing data sensed in a proximity sensor and secondary detection information separately generated in response to the generation of the primary detection information, which may result in preventing SAR exposure even if a malfunction occurs due to sensor failure.

BRIEF DESCRIPTION OF THE DRAWINGS

FIGS. 8 and 9 are conceptual views illustrating operations of a signal processing unit of a mobile terminal according to the present invention.

FIG. 10 is a flowchart illustrating a control method of determining whether or not a mobile terminal and a human body are adjacent to each other, in order to prevent SAR exposure, in the mobile terminal according to the present invention.

FIGS. 11 to 13 are conceptual views illustrating the control method of FIG. 10 in the mobile terminal according to the present invention.

DETAILED DESCRIPTION OF THE INVENTION

Figure 1:
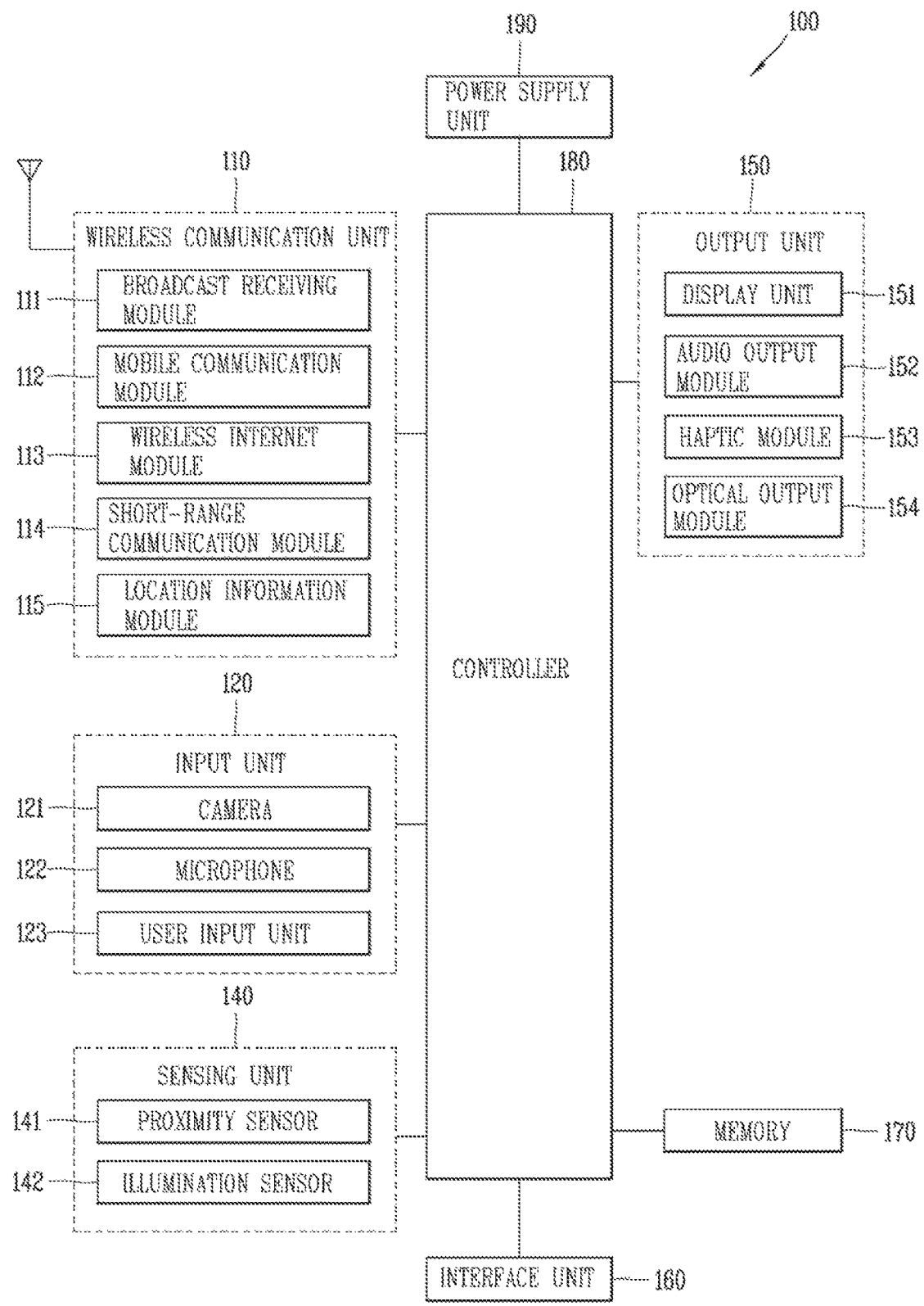
FIG. 1 is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Referring to FIG. 1, FIG. 1 is a block diagram of a mobile terminal in accordance with the present invention.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1, to execute an application program that have been stored in the memory 170. In addition, the controller 180 may control at least two of those components included in the mobile terminal 100 to activate the application program.

The controller 180 may also be called a processor, an application processor, or the like.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control general operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A user of a mobile terminal including at least one of the components of FIG. 1 may be exposed to electromagnetic waves emitted from the mobile terminal. A rate of absorbing electromagnetic waves (Specific Absorption Rate; hereinafter, referred to as SAR) may increase when the user is located closer to the mobile terminal. Accordingly, when the user is close to the main body, the mobile terminal may control an operation of the mobile terminal so as to lower SAR.

Figure 2:
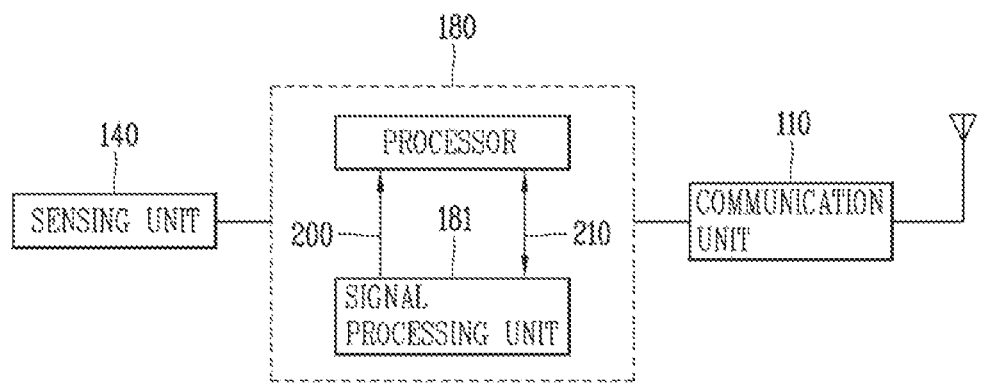
FIG. 2 is a block diagram illustrating a configuration of a mobile terminal for determining whether or not the terminal and a human body are adjacent to each other in order to prevent SAR exposure in the mobile terminal.
Figure 3:
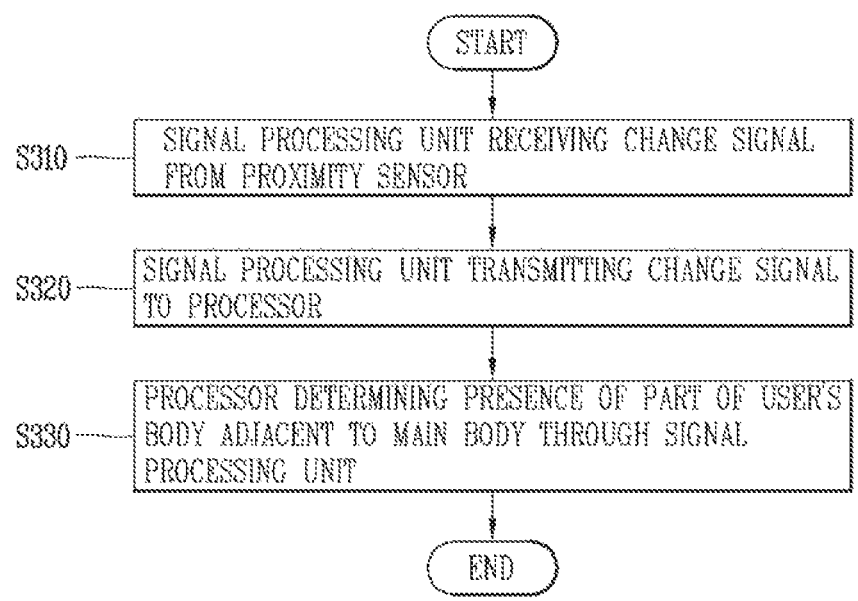
FIG. 3 is a flowchart illustrating a control method of determining whether or not the terminal and the human body are adjacent to each other, in order to prevent SAR exposure, in the mobile terminal of FIG. 2.
Figure 4:
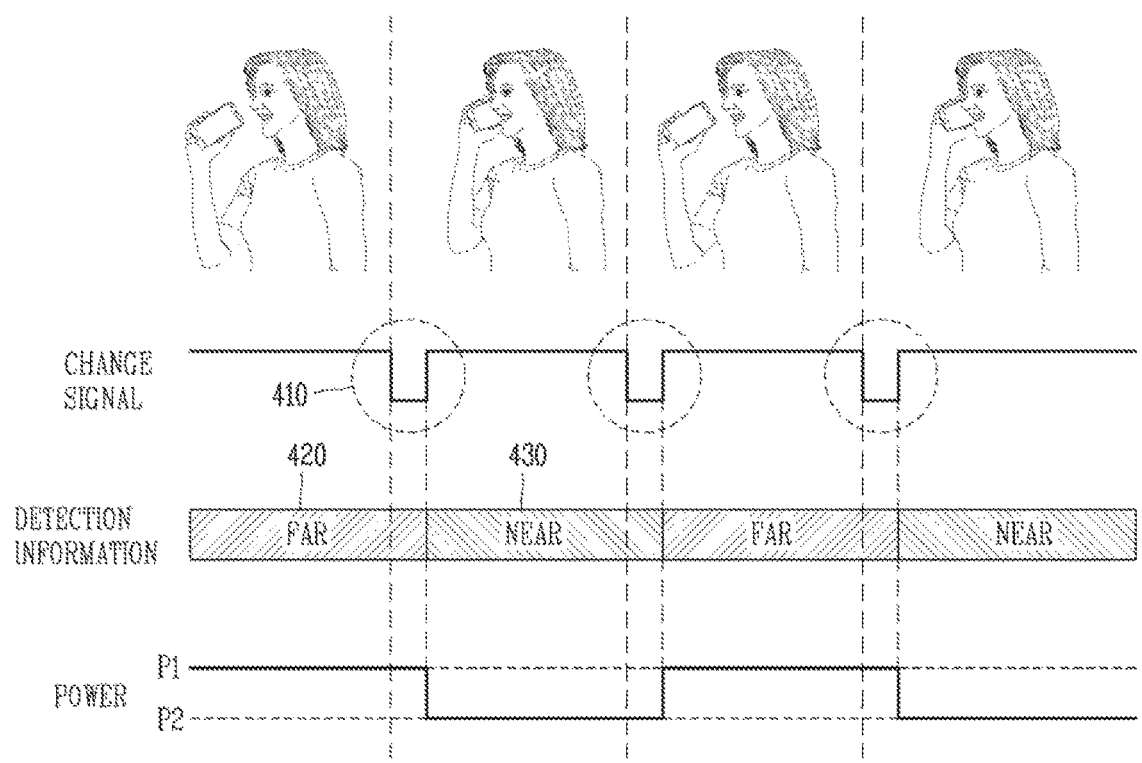
FIGS. 4 and 5A, 5B are conceptual views of the control method of FIG. 3.
Figure 5A:
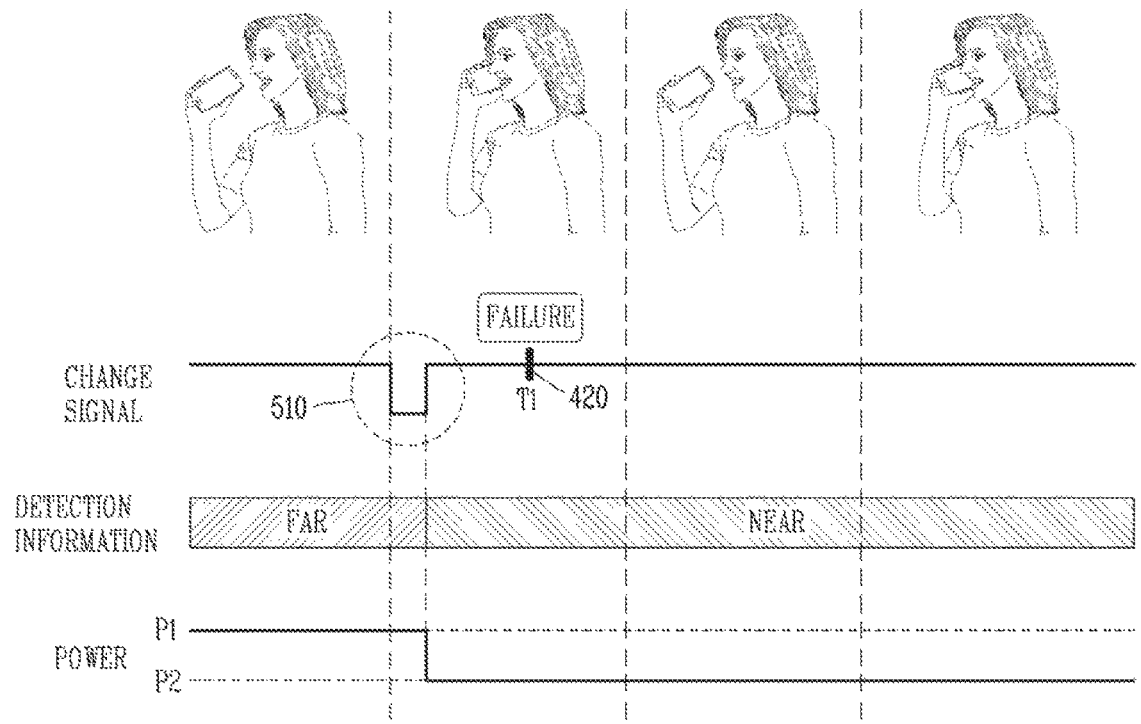
Figure 5B:
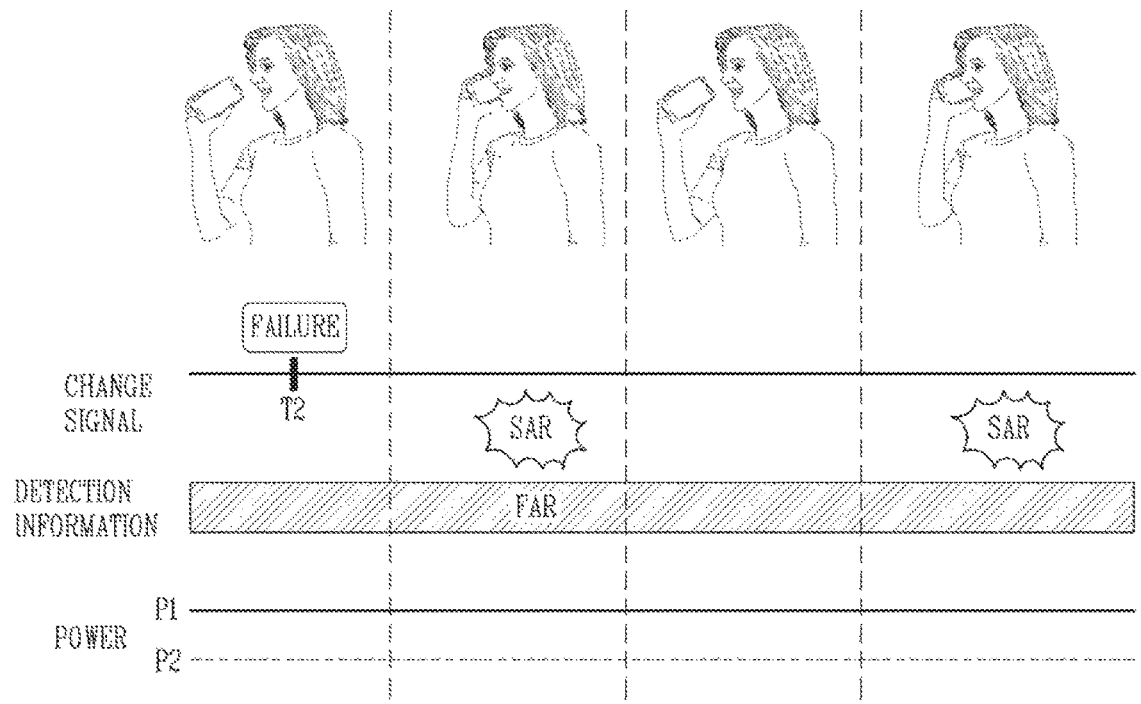

FIG. 2 is a block diagram illustrating a configuration of a mobile terminal for determining whether or not the terminal and a human body are adjacent to each other in order to prevent SAR exposure in the mobile terminal. FIG. 3 is a flowchart illustrating a control method of determining whether or not the terminal and the human body are adjacent to each other, in order to prevent SAR exposure, in the mobile terminal of FIG. 2. FIGS. 4, 5A, and 5B are conceptual views of the control method of FIG. 3.

Referring to FIG. 2, to lower the SAR, the mobile terminal may include a sensing unit 140, a processor (or a controller) 180, and a communication unit 110. The same reference numerals are used for configurations that perform the same functions as those in FIG. 1.

The communication unit 110 may include at least one antenna configured to transmit or receive a wireless signal so as to allow communication between the mobile terminal and another mobile terminal or allow wireless communication between the mobile terminal and an external server. When the antenna transmits or receives such a wireless signal, electromagnetic waves may be generated, and the generated electromagnetic waves may affect a human body.

The electromagnetic waves increase as power supplied to the communication unit 110 increases and decrease as the power supplied to the communication unit 110 decreases. The SAR, which is an influence of the electromagnetic waves on the human body, may be determined by a distance between a part of the user's body and the terminal generating electromagnetic waves and intensity of electromagnetic waves generated. Specifically, the SAR increases as the distance between the part of the user's body and the terminal generating the electromagnetic waves is shorter. Also, the SAR may increase as the generation intensity of the electromagnetic waves is higher. On the other hand, the SAR decreases as the distance between the part of the user's body and the terminal generating the electromagnetic waves is farther. In addition, the SAR decreases as the generation intensity of the electromagnetic waves is lower.

The sensing unit 140 may be configured to detect or sense a part of the user's body close to or adjacent to the main body of the mobile terminal. The sensing unit 140 may include a proximity sensor, a cap sensor, a SAR sensor, and the like. The part of the user's body includes a face, an ear, a nose, an eye, lips, a finger and the like.

The sensing unit 140 may generate sensing data that changes depending on whether a part of the user's body is adjacent thereto. Specifically, a capacitance value of a capacitor provided in the sensing unit 140 may change when a state where the part of the user's body is not adjacent to the main body is changed to a state where the part of the user's body is adjacent to the main body. Likewise, when the adjacent state between the part of the user's body and the main body is changed to the non-adjacent state, the capacitance value of the capacitor provided in the sensing unit may change. The capacitance value may be sensing data.

The sensing unit 140 may transmit the sensing data to a signal processing unit 181 in real time.

The signal processing unit 181 may play a role of processing the data received from the sensing unit 140. The signal processing unit 181 may be a semiconductor chip or the like.

On the other hand, FIG. 2 illustrates that the signal processing unit 181 is one component of the processor 180, but the present invention is not limited thereto. The signal processing unit 181 may alternatively be a component separate from the processor 180. Hereinafter, for ease of explanation, description will be given under assumption that the signal processing unit 181 is one component of the processor 180. The signal processing unit 181 may generate a change signal when a change in the sensing data received from the sensing unit 140 is detected. The change signal is a pulse signal indicating that there is the change in the sensing data.

When the change signal is generated, the signal processing unit 181 may transfer the change signal to the processor 180 along a first path 200 along which bidirectional communication is allowed, so that the processor 180 can determine whether or not the part of the user's body is adjacent to the main body. In response to the change signal being received, the processor 180 may detect presence of the part of the user's body adjacent to the main body. The change signal may also be referred to as a wake-up signal, an interrupt signal, or a trigger signal.

The processor 180 may be allowed to perform I2C communication. The processor 180 may perform data transmission or reception with the signal processing unit 181 along a second path 210 along which bidirectional communication is allowed. Here, the signal processing unit 181 may separately include the first path 200 for transmitting the change signal and the second path 210 for transmitting detection information.

The processor 180 may transmit a request signal to the signal processing unit 181 through the second path 210 to request for detection information when the change signal is received from the signal processing unit 181 through the first path 200. The signal processing unit 181 may then generate the detection information when the request signal is received. For example, the signal processing unit 181 may compare a capacitance value with a preset reference value to generate detection information indicating whether or not a part of the user's body is adjacent to the main body. The detection information may include first information 430 (see FIG. 4) indicating that the part of the user' body adjacent to the main body has been detected, or second information 420 (see FIG. 4) indicating that the part of the user's body adjacent to the main body has not been detected.

When the detection information is received from the signal processing unit 181 through the second path 210 in response to the request signal, the processor 180 may determine whether the part of the user's body is adjacent to the main body based on the detection information. The processor 180 may reduce power supplied to the communication unit 110 when it is determined that the part of the user's body adjacent to the main body exists according to the detection information. Therefore, the present invention can reduce electromagnetic waves generated in the communication unit 110 and lower the SAR.

Hereinafter, description will be given in more detail of a method of determining a user adjacent to the main body in order to lower the SAR.

Referring to FIG. 3, the signal processing unit 181 of the mobile terminal according to the present invention may receive a change signal from a proximity sensor (S310).

When a function of performing communication is executed, an SAR detecting function may be executed together in the present invention. Here, the SAR detecting function is a function of controlling power supplied to the communication unit in order to lower the SAR when a part of the user's body is adjacent to the mobile terminal.

Specifically, the signal processing unit 181 may receive sensing data from the sensing unit 140 in real time or at preset intervals when the mobile terminal executes a function of performing communication through the communication unit 110. For example, the signal processing unit 181 may receive a capacitance value from the sensing unit 140 in real time when the mobile terminal starts a call function with another terminal.

The signal processing unit 181 may generate a change signal 410 when a change in the sensing data received in real time is detected. The change signal 410 may be a pulse signal as illustrated in FIG. 4. For example, the signal processing unit 181 may generate a pulse signal when an increase or decrease in capacitance is detected. The pulse signal may have the same shape irrespective of the increase and decrease in the capacitance.

The signal processing unit 181 may transmit the generated change signal to the processor 180 (S320). The signal processing unit 181 may transmit the change signal to the processor 180 in real time, every preset period or whenever a change is detected, so that the processor 180 determines whether or not a part of the user's body is adjacent to the main body.

When the change signal is received, the processor 180 may determine presence of the part of the user's body adjacent to the main body through the signal processing unit 181 (S330).

When the change signal is received, the processor 180 may receive detection information indicating whether or not the part of the user's body is adjacent to the main body from the signal processing unit 181.

As illustrated in FIG. 4, when it is determined according to the detection information that the part of the user's body adjacent to the main body exists, the processor 180 may lower power P2 supplied to the communication unit down to a reference level or less. Here, the reference level may be a value of a supplied power value, namely, a preset value, by which the SAR value is lowered down to an allowable reference value or less. Accordingly, the present invention may lower the SAR value to the allowable reference value even if the user is adjacent to the mobile terminal. The allowable reference value is set differently for each country and for each organization, and is specified in the FCC in North America.

Meanwhile, the processor 180 may generate detection information in real time. At this time, the processor may increase power supplied to the communication unit to a normal level or a maximum level when it is determined according to the detection information that the part of the user's body which is adjacent to the main body is no longer adjacent to the main body. Here, the normal level or the maximum level refers to a level of power actually required by the communication unit to carry out communication, without considering the SAR value. Therefore, the present invention can prevent deterioration of communication performance of the mobile terminal by reducing unnecessary power use restriction.

On the other hand, if the signal processing unit 181 of the mobile terminal fails (is broken down) due to dropping the mobile terminal performing the above-described control method from a high place or due to an unknown reason, the user of the mobile terminal may be likely to be exposed to electromagnetic waves indiscriminately.

Specifically, referring to FIG. 5A, the signal processing unit 181 may detect a change in a capacitance value and generate a change signal 510. Accordingly, the processor 180 may determine that a state where a part of the user's body is not adjacent to the main body has changed to a state where a part of the user's body is adjacent to the main body. In addition, when it is determined that there is the part of the user's body adjacent to the main body, the processor 180 may lower power P2 supplied to the communication unit 110 to a level below the reference level.

However, the signal processing unit 181 may fail at a time point T1. In this case, even if the signal processing unit 181 receives the changed capacitance value from the sensing unit 140, it cannot generate the change signal. Therefore, the processor 180 may fail to receive the change signal, and continuously determine that the part of the user's body is adjacent to the main body, which is the state of the part of the user's body determined just before the failure of the signal processing unit 181. Accordingly, even if the part of the user's body is getting far from the main body, the communication unit 110 cannot increase supplied power to the normal level or the maximum level, and thereby the communication performance may be lowered.

As another example, referring to FIG. 5B, the signal processing unit 181 may fail at a time point T2 at which the processor 180 has determined that a part of the user's body is not adjacent to the main body. In this case, the signal processing unit 181 may not generate a change signal even if the part of the user's body is adjacent to the main body. Accordingly, even if the part of the user's body is adjacent to the main body, the processor 180 also determines that the part of the user's body is not adjacent to the main body, as determined just before the failure of the signal processing unit 181. Therefore, the user may be exposed to electromagnetic waves indiscriminately.

Hereinafter, a solution for preventing a situation that the user is exposed to electromagnetic waves indiscriminately upon failure of the signal processing unit 181 will be described. In the following description, the same operations as those described above are omitted for convenience of explanation.

Figure 6:
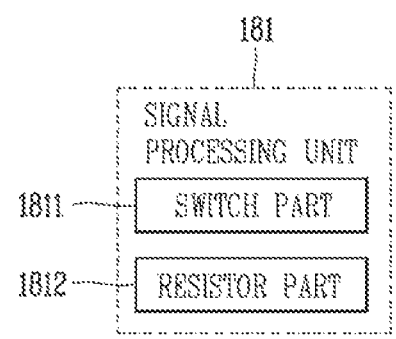
FIG. 6 is a block diagram illustrating a configuration of a signal processing unit of a mobile terminal according to the present invention.
Figure 7:
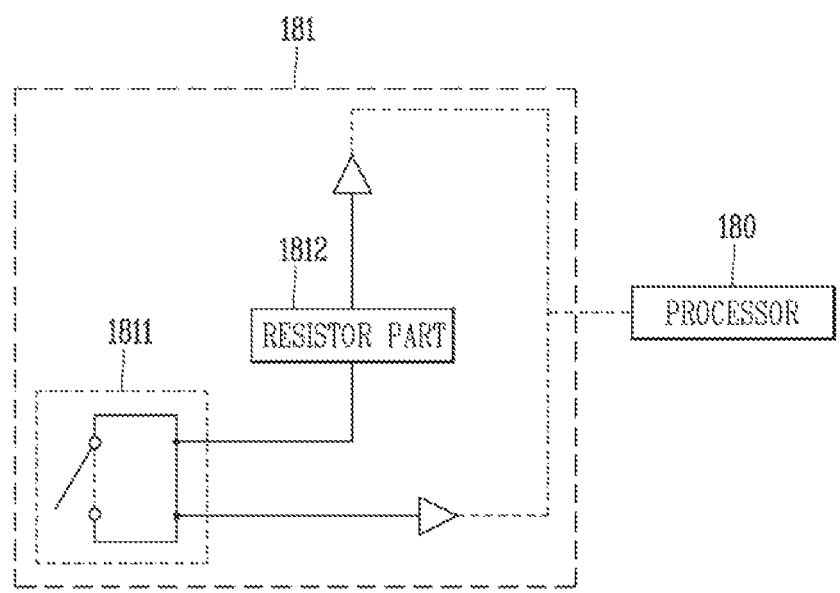
FIG. 7 is a circuit diagram of the signal processing unit of FIG. 6.

FIG. 6 is a block diagram illustrating a configuration of a signal processing unit of a mobile terminal according to the present invention, and FIG. 7 is a circuit diagram illustrating the signal processing unit of FIG. 6. FIGS. 8 and 9 are conceptual views illustrating operations of the signal processing unit of the mobile terminal according to the present invention.

The mobile terminal according to the present invention may restrict power supply to prevent the user from being exposed to electromagnetic waves even if the signal processing unit 181 fails. Specifically, the signal processing unit 181 may generate primary detection information through sensing data received from the sensing unit 140.

To this end, the signal processing unit 181 according to the present invention may have those components as illustrated in FIGS. 6 and 7. In detail, referring to FIG. 6, the signal processing unit 181 according to the present invention may include a switch part 1811 and a resistor part 1812.

The switch part 1811 may be set such that a switch is opened or short-circuited according to sensing data. The switch may utilize a variety of elements. As the switch part 1811 is opened or short-circuited, a change signal may be generated.

Referring to FIG. 8, when the switch part 1811 is opened, the resistor part 1812 may be electrically connected to one end of the switch part 1811 to generate a predetermined voltage. The resistor part 1812 may be provided with a pull-up resistor.

The primary detection information may be generated by the switch part 1811 and the resistor part 1812 and transmitted to the processor 180. At this time, the primary detection information may serve as a wake-up signal, which plays a role of the change signal described above. The processor 180 may transmit a request signal for generating secondary detection information to the signal processing unit 181 when the primary detection information is received. In response to the request signal, the signal processing unit 181 may generate the secondary detection information using sensing information contained in the sensing data, and transmit the generated secondary detection information to the processor 180. Accordingly, the processor 180 may determine whether or not a part of the user's body is adjacent to the main body (i.e., whether or not a part of the user's body adjacent to the main body exists).

Hereinafter, operations of the switch part 1811 and the resistor part 1812 for generating the primary detection information will be described in more detail with reference to FIGS. 8 and 9.

The user of the mobile terminal may make (or place) a call using the mobile terminal. In this case, the mobile terminal may execute an SAR detecting function. When the SAR detecting function is executed, the sensing unit 140 may transmit sensing data to the signal processing unit 181 in real time.

As illustrated in FIG. 8, the user may make a call at a far distance without having his/her face close to the mobile terminal. The signal processing unit 181 may receive sensing data from the sensing unit 140, which indicates a state where a part of the user's body adjacent to the main body is not present. In this case, the switch part 1811 may be short-circuited. Therefore, no current flows through the resistor part 1812 and a predetermined voltage is not applied to the resistor part 1812.

On the contrary, as illustrated in FIG. 9, the user may make a call with having his/her face close to the mobile terminal. The signal processing unit 181 may receive sensing data from the sensing unit 140, which indicates a state where a part of the user's body adjacent to the main body is present. In this case, the switch part 1811 may be opened. In this case, a current flows along the resistor part 1812 and a predetermined voltage is applied to the resistor part 1812.

The signal processing unit 181 may generate the primary detection information using the predetermined voltage applied to the resistor part 1812. The primary detection information may include first information indicating presence of the part of the user's body adjacent to the main body and second information indicating absence of the part of the user's body adjacent to the main body.

More specifically, the signal processing unit 181 may generate the first information when the predetermined voltage is applied to the resistor part 1812, while generating the second information when the predetermined voltage is not applied to the resistor part 1812.

When the primary detection information is generated, the signal processing unit 181 may transmit the primary detection information to the processor 180 through a first path.

Meanwhile, although not illustrated, the user of the mobile terminal may not use the communication function of the mobile terminal. In this case, the SAR detecting function is not executed. When the SAR detecting function is not executed, the signal processing unit 181 does not generate the primary detection information.

The foregoing description has been given of the operations of the signal processing unit of the mobile terminal according to the present invention. Hereinafter, description will be given of a method of determining whether or not a human body is adjacent to the mobile terminal for preventing an SAR, in the mobile terminal according to the present invention including the signal processing unit described with reference to FIGS. 6 to 9.

Figure 12:
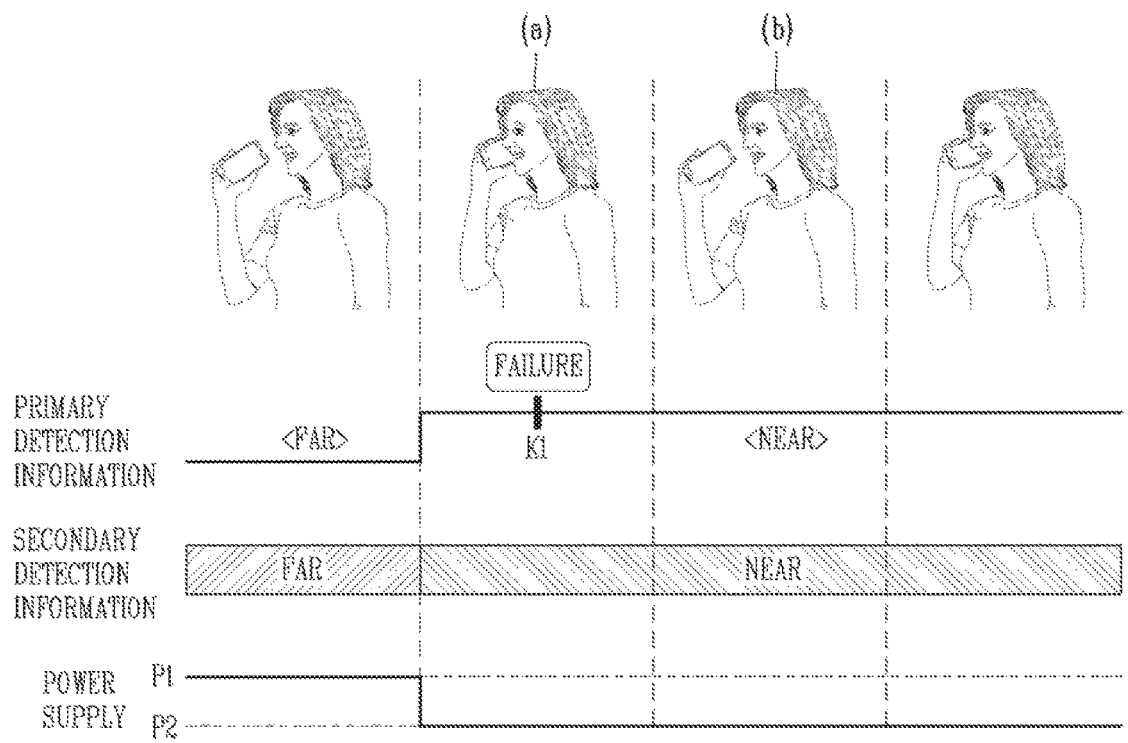
Figure 13:
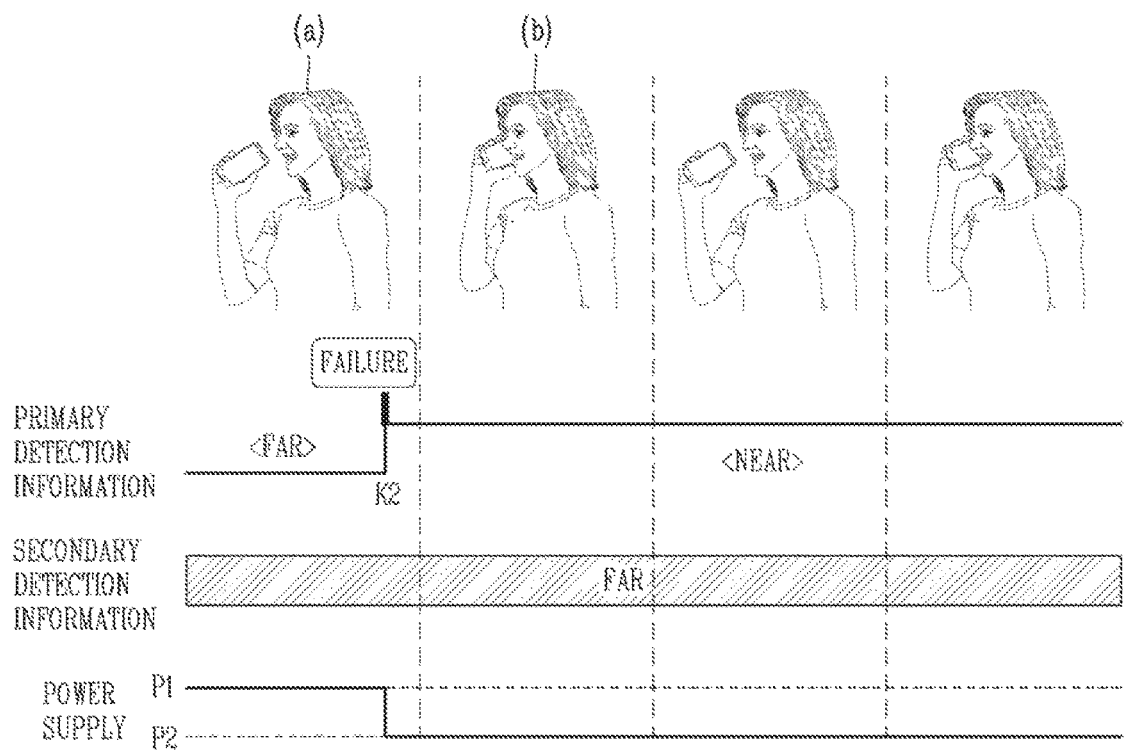

FIG. 10 is a flowchart illustrating a control method of determining whether or not a mobile terminal and a human body are close to each other, in order to prevent SAR exposure, in the mobile terminal according to the present invention. FIGS. 11 to 13 are conceptual views illustrating the control method of FIG. 10 in the mobile terminal according to the present invention.

Referring to FIG. 10, the signal processing unit 181 of the mobile terminal according to the present invention may generate primary detection information based on sensing data received from the sensing unit 140 (S1010).

The primary detection information may be generated as described in FIGS. 6 to 9. Description thereof will be replaced with the foregoing description given with reference to FIGS. 6 to 9. The signal processing unit 181 may transmit the primary detection information to the processor 180 through the first path 200 (see FIG. 2), such that the processor 180 generates secondary detection information.

That is, the primary detection information may indicate information related to a part of the user's body adjacent to the main body, and also serve as a trigger signal for generating the secondary detection information in the processor 180.

When the primary detection information is received, the processor 180 may generate secondary detection information, which indicates whether or not an object adjacent to the main body exists, through the signal processing unit 181 (S1020).

The secondary detection information may be generated independent of the primary detection information. Specifically, in response to the reception of the primary detection information along the first path, the processor 180 may transmit a request signal to the signal processing unit 181 along the second path 210 to request for detection information related to the part of the user's body adjacent to the main body (see FIG. 2).

The signal processing unit 181 may generate the secondary detection information, which indicates a detection result of the part of the user's body adjacent to the main body, based on the sensing data received from the sensing unit 140. The signal processing unit 181 may transmit the secondary detection information to the processor 180 along the second path 210 (see FIG. 2).

The processor 180 may compare the primary detection information with the secondary detection information to determine whether or not the object adjacent to the main body exists (S1030).

When the primary detection information and the secondary detection information coincide with each other, the processor 180 may determine whether or not a part of the user's body adjacent to the main body exists according to the secondary detection information.

For example, as illustrated in (a) of FIG. 11, when the primary detection information and the secondary detection information both indicate that the part of the user's body adjacent to the main body has not been detected, the processor 180 may determine based on the secondary detection information that the part of the user's body adjacent to the main body does not exist.

Also, as illustrated in (b) of FIG. 11, when the primary detection information and the secondary detection information both indicate that the part of the user's body adjacent to the main body has been detected, the processor 180 may determine based on the secondary detection information that the part of the user's body adjacent to the main body exists.

On the other hand, referring to FIGS. 12 and 13, failure of the signal processing unit 181 may occur in the mobile terminal according to the present invention. In this case, the signal processing unit 181 may generate erroneous primary detection information and secondary detection information.

For example, as illustrated in FIG. 12, in the mobile terminal according to the present invention, failure K1 of the signal processing unit 181 may occur (a state (b) of FIG. 12) in a state where the processor 180 has determined that there is a part of the user's body adjacent to the main body.

After the failure of the signal processing unit 181 occurs, the signal processing unit 181 may not generate primary detection information according to a change in a capacitance value received from the sensing unit 140. Therefore, as illustrated in (b) of FIG. 12, the primary detection information may indicate a state in which a part of the user's body adjacent to the main body has been detected even after the part of the user's body is distant from the main body. That is, an error of the primary detection information may occur.

The processor 180 may request the signal processing unit 181 for secondary detection information as the erroneous primary detection information is received. In this case, since the signal processing unit 181 is in the failed state, the signal processing unit 181 cannot newly generate the secondary detection information using the sensing data received from the sensing unit 140. Accordingly, the signal processing unit 181 may transmit secondary detection information generated before the failure to the processor 180. Therefore, the secondary detection information has a value determined before the failure of the signal processing unit. For example, the signal processing unit 181 may transmit information indicating that the part of the user's body adjacent to the main body has been detected, which is the state ((a) of FIG. 12) determined before the failure of the signal processing unit 181, to the processor 180 as the secondary detection information.

As illustrated in (b) of FIG. 12, the processor 180 may determine that both the secondary detection information and the primary detection information indicate that the part of the user's body adjacent to the main body has been detected, and thus determine that the part of the user's body adjacent to the main body is present. Accordingly, the processor 180 can reduce power P2 supplied to the communication unit 110. That is, the processor 180 reduces the power supply even if the part of the user's body adjacent to the main body is not detected. Thus, even if the failure of the signal processing unit 181 occurs, the present invention can reduce possibility that the user is exposed to the risk of the SAR.

As another example, referring to FIG. 13, in the mobile terminal according to the present invention, when the processor 180 has determined that there is not a part of the user's body adjacent to the main body ((a) of FIG. 13), failure (K2) of the signal processing unit 181 may occur (a state (a) of FIG. 13).

In this case, as illustrated in (b) of FIG. 13, the signal processing unit 181 may generate primary detection information, which indicates that a part of the user's body adjacent to the main body has been detected, regardless of sensing data received from the sensing unit 140. Specifically, when the failure occurs in the signal processing unit 181, the switch part 1811 is forcibly opened, and accordingly, a predetermined voltage is applied to the resistor part 1812. Thus, the primary detection information may be generated to indicate that the part of the user's body adjacent to the main body has been detected. That is, when the failure occurs in the signal processing unit 181, the primary detection information may be fixed as information indicating that the part of the user's body adjacent to the main body has been detected.

Meanwhile, the processor 180 may transmit a request signal to the signal processing unit 181 to request for secondary detection information when the primary detection information is received. In this case, the signal processing unit 181 may transmit secondary detection information, which has been generated before the failure of the signal processing unit 181, in response to the request signal transmitted to the processor 180. In this case, since the signal processing unit 181 is in the failed state, the signal processing unit 181 cannot newly generate the secondary detection information using the sensing data received from the sensing unit 140. Accordingly, the signal processing unit 181 may transmit secondary detection information determined before the failure to the processor 180. Thus, the processor 180 may receive the secondary detection information indicating that the part of the user's body adjacent to the main body has not been detected.

The processor 180 may determine that the part of the user's body adjacent to the main body exists when receiving the primary detection information indicating that the part of the user's body adjacent to the main body has been detected, and the secondary detection information indicating that the part of the user's body adjacent to the main body has not been detected. Accordingly, the processor 180 can reduce the power P2 supplied to the communication unit 110. That is, the processor 180 can always reduce the power supply regardless of whether or not the part of the user's body adjacent to the main body is detected, thereby preventing SAR exposure.

The foregoing description has been given of the method of responding to malfunction of the processor 180 when the signal processing unit 181 malfunctions due to failure. The following table summarizes the operations of the processor 180 according to the primary detection information and the secondary detection information.

TABLE 1

| Primary detection information | FAR | NEAR | FAR | NEAR | FAR OR NEAR |
|---|---|---|---|---|---|
| Secondary detection information | FAR | FAR | NEAR | NEAR | ERROR |
| Final determination | FAR | NEAR | NEAR | NEAR | NEAR |
| Power supply | P1 | P2 | P2 | P2 | P2 |

For the sake of brevity, first information indicating that a part of the user's body adjacent to the main body has been detected is indicated as NEAR, and second information indicating that the part of the user's body adjacent to the main body has not been detected is indicated as FAR. P1 denotes normal power or maximum power supplied to the communication unit, and P2 denotes reduced power supplied to the communication unit to satisfy the SAR requirement.

In this manner, even when the part of the user's body adjacent to the main body is not detected due to a malfunction caused by failure of the signal processing unit, power supply can be reduced, thereby minimizing possibility to be exposed to the risk of SAR.

As described above, in a mobile terminal according to the present invention, whether or not a part of a user's body adjacent to the main body exists can be determined by comparing primary detection information detecting the part of the user's body adjacent to the main body and secondary detection information separately generated in response to the generation of the primary detection information by using sensing data sensed in a proximity sensor, which may result in preventing exposure to the risk of the SAR even if a malfunction occurs due to sensor failure.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A mobile terminal, comprising:
   a main body;
   a communication unit mounted in the main body and configured to perform communication with an external device;
   a proximity sensor to detect a part of a user's body adjacent to the main body when the communication is performed through the communication unit;
   a signal processing unit configured to generate primary detection information, indicating a change in a detection result of the part of the user's body adjacent to the main body, based on sensing data received from the proximity sensor; and
   a processor configured to:
      transmit a request signal through a first path to the signal processing unit to request for secondary detection information, indicating the detection result of the part of the user's body adjacent to the main body, in response to the primary detection information received from the signal processing unit; and
      determine whether or not the part of the user's body adjacent to the main body exists, through comparison between the primary detection information and the secondary detection information when the secondary detection information is received through a second path from the signal processing unit,
   wherein the signal processing unit comprises:
      a switch configured to be short-circuited or opened based on the sensing data received from the proximity sensor; and
      a resistor connected to one end of the switch such that a current flows therealong when the switch is opened and a predetermined voltage is applied thereto, and
   wherein the signal processing unit is further configured to generate the primary detection information using the predetermined voltage applied to the resistor.

2. The terminal of claim 1, wherein the processor is further configured to:
   determine whether or not the part of the user's body adjacent to the main body exists according to the secondary detection information when the primary detection information and the secondary detection information coincide with each other; and
   determine that the part of the user's body adjacent to the main body exists when the primary detection information and the secondary detection information are different from each other.

3. The terminal of claim 2, wherein the processor is further configured to:
   determine that the part of the user's body adjacent to the main body exists when both the primary detection information and the secondary detection information indicate that the part of the user's body adjacent to the main body is detected; and
   determine that the part of the user's body adjacent to the main body does not exist when both the primary detection information and the secondary detection information indicate that the part of the user's body adjacent to the main body is not detected.

4. The terminal of claim 2, wherein the processor determines that the part of the user's body adjacent to the main body exists when the primary detection information indicates that the part of the user's body adjacent to the main body is detected and the secondary detection information indicates that the part of the user's body adjacent to the main body is not detected.

5. The terminal of claim 2, wherein the processor determines that the part of the user's body adjacent to the main body exists when the primary detection information indicates that the part of the user's body adjacent to the main body is not detected and the secondary detection information indicates that the part of the user's body adjacent to the main body is detected.

6. The terminal of claim 1, wherein the switch is:
   short-circuited when the sensing data indicates that the part of the user's body adjacent to the main body is detected; and
   opened when the sensing data indicates that the part of the user's body adjacent to the main body is not detected.

7. The terminal of claim 1, further comprising a power supply unit to supply power to the communication unit,
   wherein the processor is further configured to control power supplied from the power supply unit to the communication unit according to the detection result.

8. The terminal of claim 7, wherein the processor is further configured to:
   reduce an amount of the power supplied to the communication unit when it is determined that the part of the user's body adjacent to the main body exists; and
   increase the amount of the power supplied to the communication unit when it is determined that the part of the user's body adjacent to the main body does not exist.

* * * * *